Dec. 18, 1934.  C. J. ZINKE  1,984,561
WEIGHING SCALE
Filed Jan. 16, 1933  2 Sheets—Sheet 1
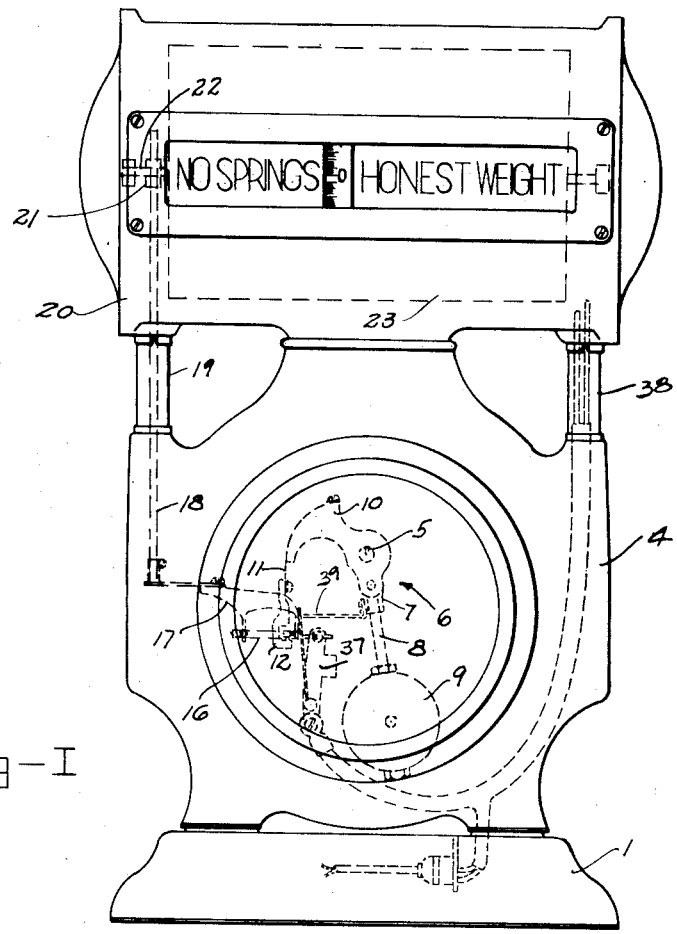
Fig-I
Fig-VI
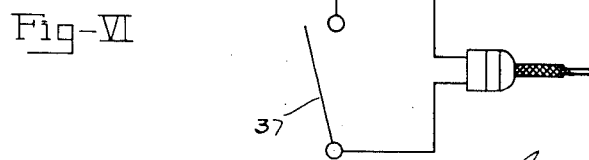
Carl J. Zinke
INVENTOR
ATTORNEY Dec. 18, 1934.   C. J. ZINKE   1,984,561
WEIGHING SCALE
Filed Jan. 16, 1933   2 Sheets-Sheet 2
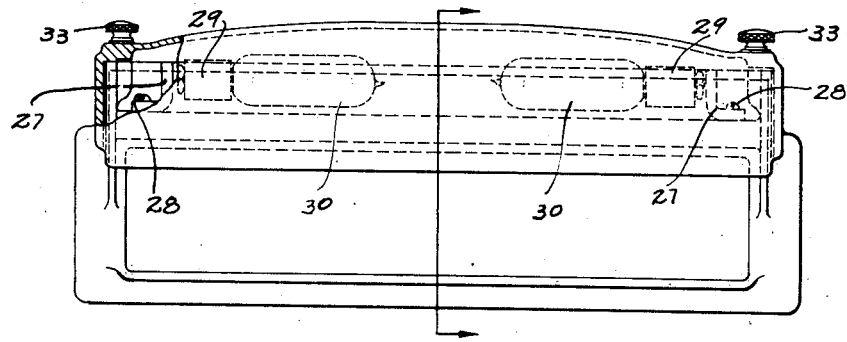
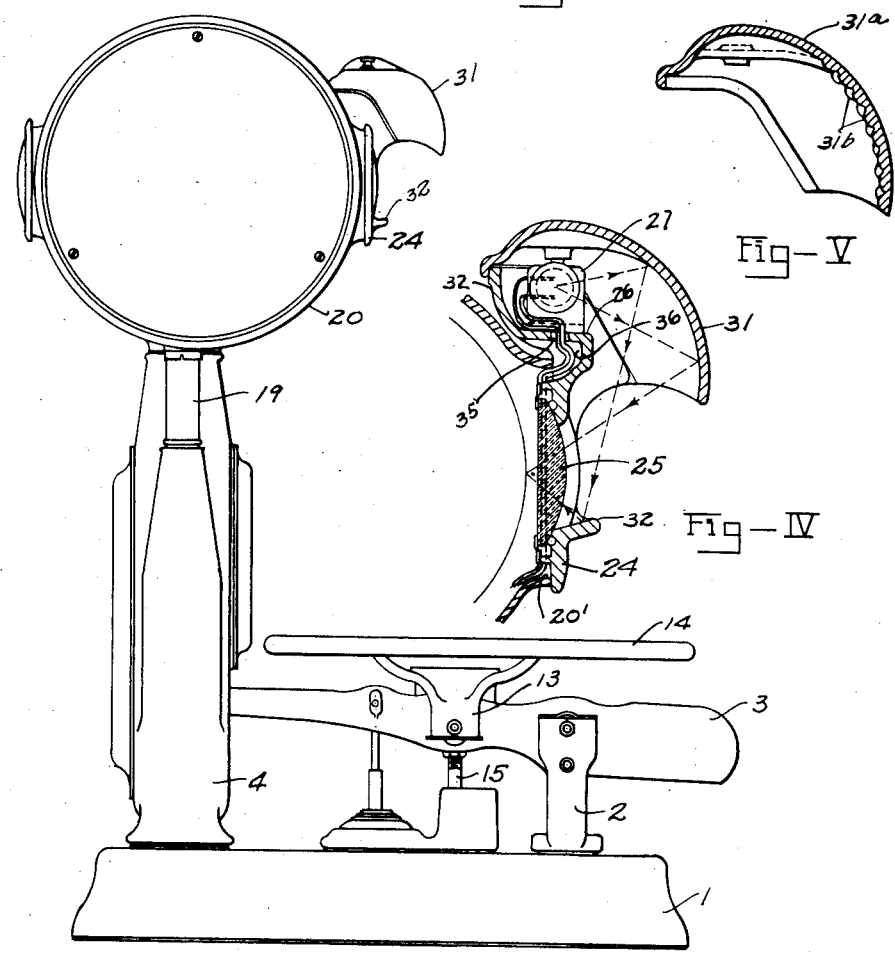
Carl J. Zinke
INVENTOR
C. O. Marshall
ATTORNEY Patented Dec. 18, 1934

1,984,561

UNITED STATES PATENT OFFICE 1,984,561

WEIGHING SCALE

Carl J. Zinke, Toledo, Ohio, assignor to Toledo Scale Manufacturing Company, Toledo, Ohio, a corporation of New Jersey Application January 16, 1933, Serial No. 651,951

3 Claims. (Cl. 240—2.11)

This invention relates generally to weighing scales and particularly to weighing scales of the type in which an indicating chart is disposed in back of a glazed window through which the indication is read. The glass, covering the window opening, may be in the form of a magnifying lens or a plane sheet. My invention, however, may also be employed in scales in which the indicating chart is unprotected when its surface is prone to reflect substantially undiffused light rays.

Although many scales of the type referred to are equipped with inbuilt illuminating means, large numbers are constructed and sold which depend upon the room illumination; very frequently such scales become useless when through rearrangement of the room in which they are located, they are moved into a position where the light is insufficient to properly illuminate the indication.

Attempts have been made to provide illumination in such cases, by attaching an electric lamp to the outside of the casing which encloses the chart, and in such a position that light therefrom shines through the window onto the chart. It was found, however, that the lens or other glazing material reflects the image of the glowing filament, making it very difficult to distinguish the indicia on the chart.

My invention has for its primary object the provision of improved means for externally illuminating the indicating means of a scale.

Another object is the provision of improved means whereby such illuminating means may be attached to a finished scale after installation.

Still another object is the provision of improved means whereby an externally attached light may be employed to illuminate a scale indicating chart, located in back of a lens, without reflecting the image of the light source.

An ancillary object is the provison of improved means whereby an externally attachable illuminating arrangement on a scale may be controlled by an interiorly disposed switch.

These and other objects and advantages will be apparent from the following description in which reference is had to the accompanying drawings illustrating a preferred embodiment of my invention and wherein similar reference numerals refer to similar parts throughout the several views.

In the drawings:

Figure I is a front elevational view, of a scale particularly well adapted for the attachment of the preferred embodiment of my invention.

Figure II is a side elevational view thereof showing the embodiment of my invention attached thereto.

Figure III is an enlarged front elevational view of my improved illuminating attachment, a portion thereof being broken away.

Figure IV is a cross sectional view of the device depicted in Figure III, sectioned substantially along the line IV—IV.

Figure V is a similar sectional view of a modification of the reflecting hood, showing in detail configurations on a portion of its reflecting surface; and Figure VI is a typical wiring diagram of the electric illuminating circuit.

Since the scale to which I have shown the embodiment of my invention attached is widely known and is further fully disclosed in United States Patent No. 1,714,623 to Reeves, I will describe it hereinafter only so far as is necessary to fully disclose my invention.

Referring to the drawings in detail, upon a base 1 (Figure II) is mounted an upwardly extending bracket or "base horn" 2 which oscillatably supports fulcrum pivots (not shown) of a main lever 3. The end of this lever extends into the interior of a housing 4 stationed upon and fastened to the opposite end of the base 1. Bearings (not shown) extending inwardly from the walls of this housing support a pivot 5 extending through a pendulum 6 which is thus oscillatably suspended from the bearings. This pendulum comprises a body 7, a stem 8 fixed therein, and a pendulum weight 9 adjustably mounted thereon. A power sector 10 is also adjustably secured to the pendulum body 7, its arcuate surface is overlaid by a flexible metallic tape 11, whose upper end is fastened to the sector. A stirrup 12 is suspended from the lower end of this tape and engages a nose pivot fixed in that portion of the lever 3 which extends into the interior of the housing. A pair of load pivots, (not shown) which are in spaced relation to the fulcrum pivots, extending laterally from the sides of the lever 3 support a load platter supporting spider 13 upon which a platter 14 is mounted. A downwardly extending stem 15 fixed in the spider is pivotally connected to a check link (not shown) and these parts in the well known manner maintain the condition of level of the platter. An extending portion 16 of the nose end of the lever provides a bearing for a rack foot 17 to which rack rod 18 is fastened. This rack rod extends upwardly through a protector tube 19 situated between the housing 4 and an indicator casing 20 which surmounts the housing 3. Teeth cut into the rack rod 18 engage the teeth of a pinion 21 which is secured to a shaft 22 on which a cylindrical weight and value indicating chart 23 is mounted.

When a load is placed on the platter 14, gravity acting thereon causes the lever to move downwardly and thus the pendulum 6, to which it is connected by the tape 11, moves outwardly and upwardly until its weight moment equals the weight of the load on the platter. The chart 23 is turned by the cooperation of the rack through an angular distance which is proportional to the movement of the lever and pendulum and thus serves to invariably indicate the weight of the load. The casing 20 has an opening 20$^I$, which extends the length of the chart 23.

The embodiment of my invention provides a frame 24 adapted to be fastened over the opening 20$^I$ interchangeably with the original frame. The frame 24 is blazed with a cylindrical lens 25 for the purpose of magnifying indicia on the chart in the customary manner. For the purpose of illuminating the indication without causing undesirable reflections in the lens, I provide the frame 24, above the lens, with a horizontal shelf-like portion 26 upon which brackets 27 are fastened by screws 28 for the reception of sockets 29 into which the usual lamps 30 are screwed. Thus the lamps are stationed above the lens and light therefrom is prevented from falling directly on it, hence images of the lamp filaments are not reflected. A detachable hood 31 fastened to suitable bosses, on the shelf-like portion 26 by thumb screws 33, covers the lamps and since the inner contour of the hood is parabolic or of other suitable shape and provided with a reflecting surface, the majority of light rays emanating from the lamps are directly reflected thereby through the lens onto the chart. (See Figure IV.) Since some of the light rays reflected from the hood will stray and not impinge on the chart directly, I provide a further reflecting surface 32 at the bottom of the lens opening in the frame 24. This reflecting surface extends outwardly at an angle so that the majority of such straying light rays are reflected therefrom through the lens onto the chart.

These reflectors hereabove referred to are preferably provided with a lusterless, dull reflecting surface so that the rays before striking the lens are properly diffused and thus preventing images to be reflected by the lens. Such a reflector is prepared by spraying molten metal, this provides a finely grained surface which is then chrome plated. A surface so prepared will reflect only diffused light rays and for the purpose herein described is very efficient and satisfactory.

Since the preparation of such reflecting surfaces, however, is very expensive and difficult I have shown a modification in Figure V. The inner surfaces of this modified reflector casting 31$a$ is nodulated, as at 31$b$ or stippled. These configuration, after being porcelain enameled, also diffuse the light rays and prevent the reflection of images.

Inbuilt lighting attachments are usually in an electric circuit having a switch which is controlled by a movable member of the scale mechanism (Figure VI) so that the lamps are lit only while a commodity is on the platter. This naturally effects a saving in electricity since current is consumed only when the scale is actually in operation. I, therefore, have provided the frame 24 with aperture 35 and a passage 36 through which the wires 34 may enter the interior of the casing 20 and extending through a tube 38 which connects the casing 20 and the housing 4 to a make and break switch 37 which may be readily attached to the interior of the housing so that the circuit may be made or broken by a member 39 fastened to the pendulum 6. It will be seen that when my improved device is attached to a non-illuminated scale after it has been installed in a store or other location it achieves the same efficiency and is equally convenient as an inbuilt lighting arrangement.

It is further obvious that the device hereinbefore described is well suited to fulfill the objects primarily stated, it is to be understood, however, that the invention herein shown and described is susceptible to variation, modification and change within the spirit and scope of the subjoined claims.

Having described my invention, I claim:

1. In a device of the class described, in combination, weighing mechanism, indicating means actuated thereby, said indicating means comprising an indicia bearing chart, a lens stationed in front of said chart to magnify the indicia thereon, a lamp stationed above said lens, partitioning means between said lens and said lamps, a reflector for directing a portion of such light rays emanating from said lamp through said lens onto said chart and a second reflector stationed adjacent said lens for reflecting another portion of such light rays onto said chart.

2. In a device of the class described, in combination, weighing mechanism, indicating means actuated thereby, said indicating means comprising a cylindrical indicia bearing chart, a casing therefor, a cylindrical lens stationed in said casing and in front of said cylindrical chart, a source of light rays attached to said casing, means for preventing such light rays from striking said lens directly, a member for substantially covering said source of light rays and reflecting a quantity of such rays on said lens, and a second member disposed adjacent said cylindrical lens in parallelism to its longitudinal axis for reflecting a quantity of reflected rays on said lens.

3. In a device of the class described, in combination, weighing mechanism, indicating means actuated thereby, said indicating means comprising a cylindrical indicia bearing chart, a casing therefor, a cylindrical lens stationed in said casing and in front of said cylindrical chart, a source of light rays attached to said casing, means for preventing such light rays from striking said lens directly, a member for substantially covering said source of light rays and reflecting a quantity of such rays on said lens, and a second member disposed adjacent said cylindrical lens in parallelism to its longitudinal axis for reflecting a quantity of reflected rays on said lens, said members having a granular reflecting surface.

CARL J. ZINKE.